Jan. 2, 1962 R. B. FROST ET AL 3,015,502
GROOVED TUBING FOR CONNECTION WITH SLEEVE TYPE COUPLING
Filed Nov. 29, 1957 2 Sheets-Sheet 1
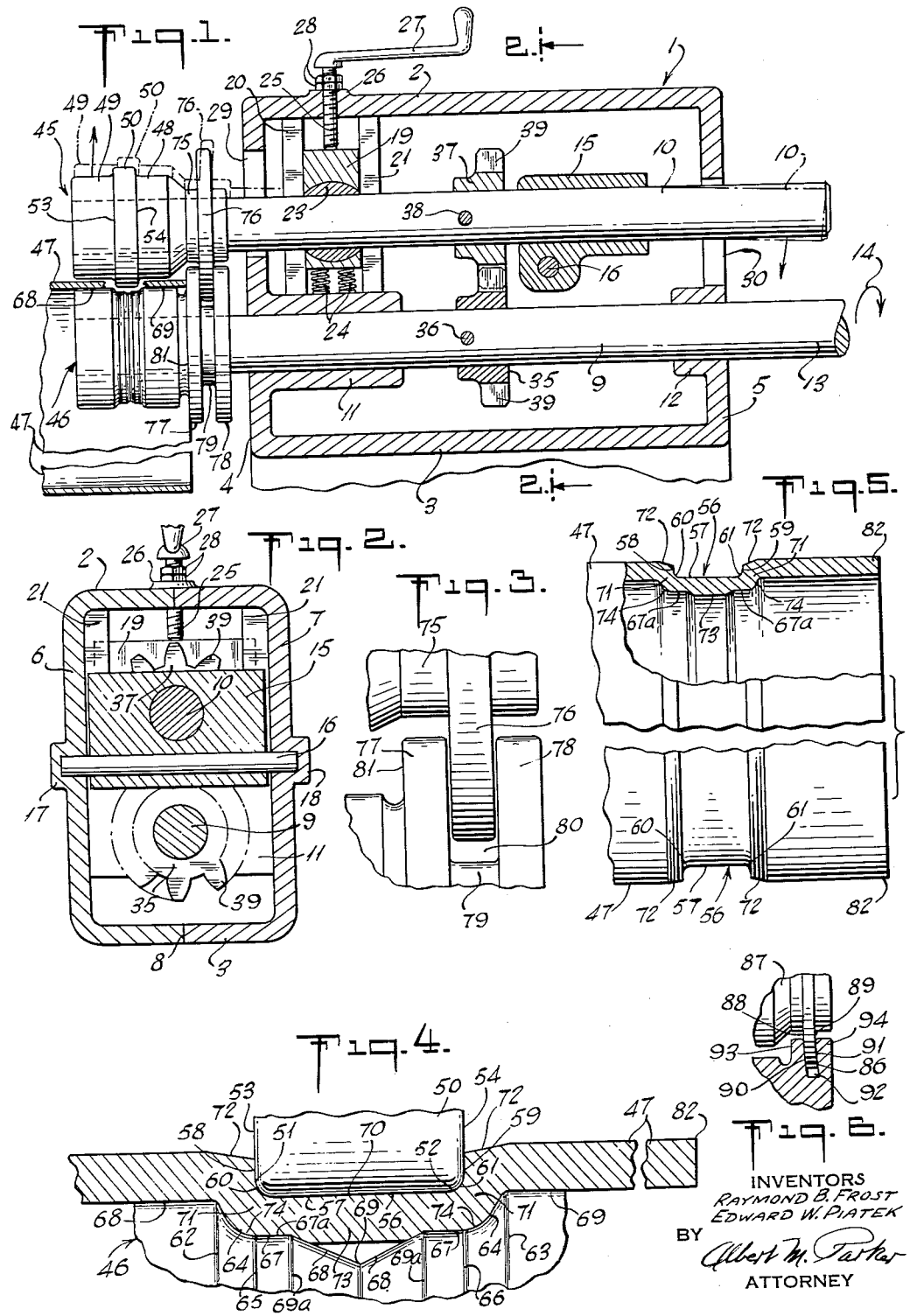
INVENTORS
RAYMOND B. FROST
EDWARD W. PIATEK
BY
Albert M. Parker
ATTORNEY Jan. 2, 1962   R. B. FROST ET AL   3,015,502
GROOVED TUBING FOR CONNECTION WITH SLEEVE TYPE COUPLING
Filed Nov. 29, 1957   2 Sheets-Sheet 2
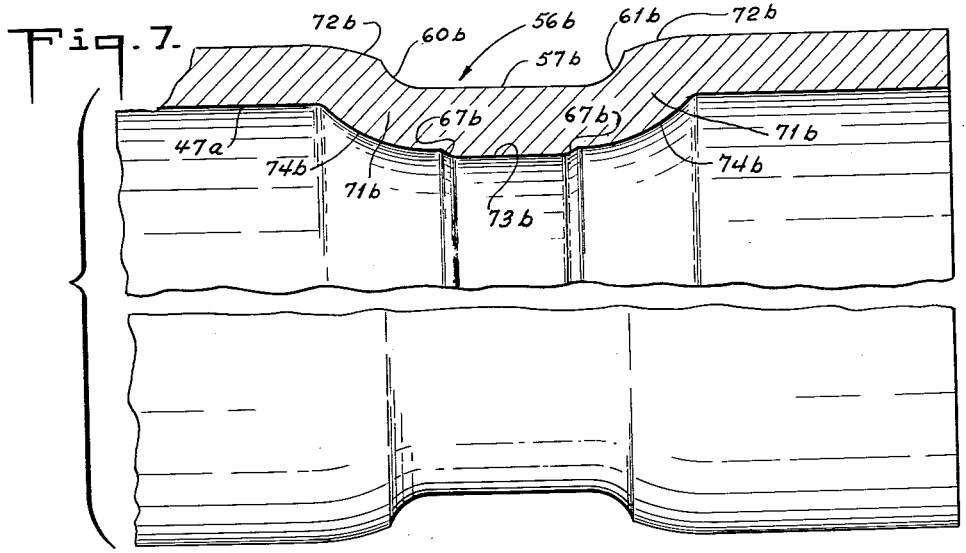
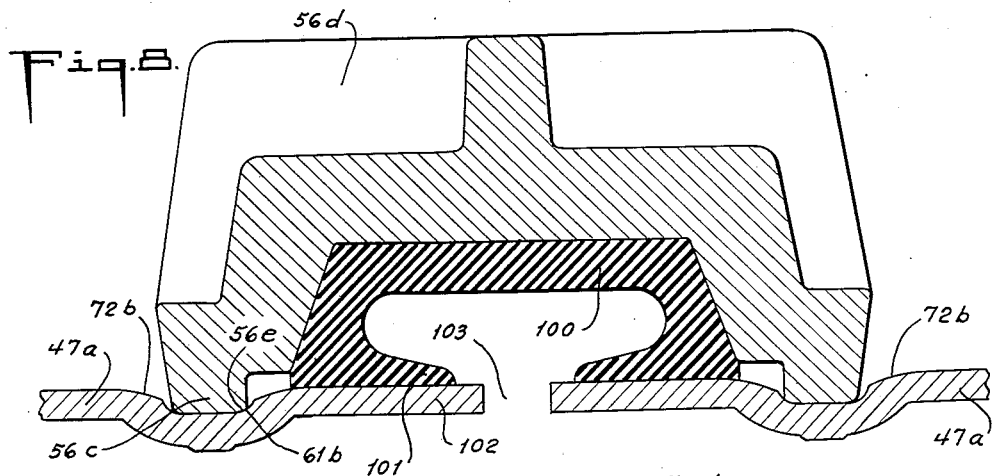
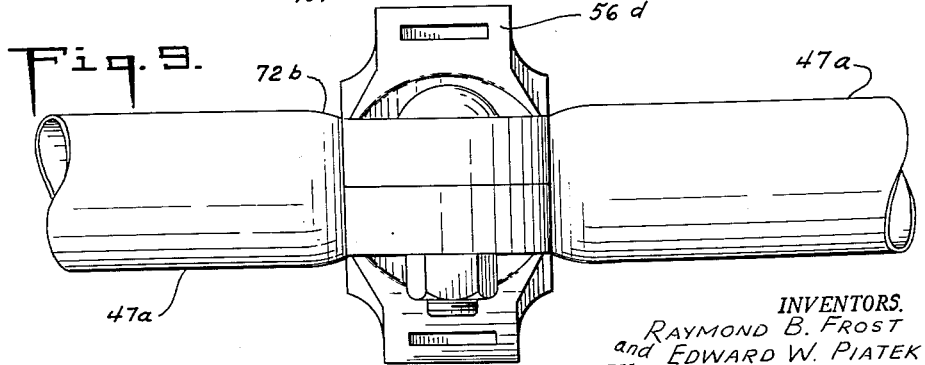
INVENTORS.
RAYMOND B. FROST
and EDWARD W. PIATEK
BY
Albert M. Parker
ATTORNEY.

United States Patent Office
3,015,502
Patented Jan. 2, 1962

3,015,502
GROOVED TUBING FOR CONNECTION WITH
SLEEVE TYPE COUPLING
Raymond B. Frost, Springfield, and Edward W. Piatek,
Linden, N.J., assignors to Victaulic Co. of America,
Union, N.J., a corporation of New Jersey
Filed Nov. 29, 1957, Ser. No. 699,866
5 Claims. (Cl. 285—112)

This invention relates to thin walled pipe or tubing having coupling grooves formed therein and to methods for forming such grooves. It is more particularly concerned with such pipe or tubing having the grooves formed therein by rolling and with methods for rolling such grooves.

Though the economical production of thin walled pipe or tubing has been developed to a high degree, the use of such conduit in piping or the laying of pipe lines, particularly of temporary or semi-permanent nature, has been held up due to the lack of economical effective provision for coupling sections of such pipe or tubing together. Generally, it has been considered necessary to apply additional members to the sections of pipe or tubing by welding, brazing, or other suitable action, and then to engage such additional members with special coupling means. This has been due to the thin wall of the conduit precluding threading or cutting grooves.

The shear strength of the material, whether ferrous or non ferrous, out of which light weight pipe or tubing is made, is substantially less than its tensile strength. The cutting of grooves in light wall pipe and tubing for the reception of the key sections of coupling housings is out of the question because so little of the wall thickness is left and shear strength is reduced so low. However, the cutting of grooves in normal weight pipe following the teaching of the Tribe Patent No. 1,541,601 had led to the establishment of the belief that it was necessary to have a straight side wall extending throughout practically the full depth of the groove if the key sections of the coupling housing were to hold in place in the groove while the conduit was under internal pressure. Thus it was initially felt that in the rolling of grooves for coupling purposes such grooves should likewise have straight side walls for substantially the full depth of the groove. Any efforts to do this, however, would be similarly doomed to failure, for even if it could be done, the shear strength of the conduit would, again, be too greatly reduced. Thus for some time the possibility of coupling light wall pipe and tubing by the use of grooves formed therein was put aside as unworkable.

The instant invention reverses the prior art thinking on that score and provides a groove and the method for forming the same in light wall pipe and tubing, both ferrous and non ferrous. This groove and method enable the uniform, economical coupling of thin walled pipe and tubing to be accomplished effectively, while employing coupling housings the same as those so effectively employed for coupling standard wall thickness pipe in which grooves could be formed by cutting. More particularly, it has been found in accordance with the invention, that such coupling housings can be effectively employed for the coupling of thin wall pipe and tubing having grooves rolled therein for reception of the key sections, which grooves, for the normal sizes of the conduit, have no straight side wall at all. Instead, effective coupling is achieved with side wall concavely curved upward from the bottom of the groove at a substantial radius. Moreover, the invention comprehends the formation of a small portion of the side wall as being straight when called for by special conditions and otherwise if the conduit be made of steel. In this latter instance, as well as that in which the side wall is entirely devoid of any straight portion, the necessary structural strength is achieved by the particular provisions made in accordance with the invention for enabling the flow of metal about the groove as the groove is being rolled. Thus the grooving of the invention retains and even enhances the strength of the tube material at the grooved section to such an extent that coupled sections of the tube when put under pressure, will burst elsewhere than at their grooves. In addition, the grooving of the invention provides a minimum of constriction of the interior of the tube at the groove position and the constriction it does provide is of such a form as to keep the impedance to the flow of the fluid down to a minimum.

It is, accordingly, a principal object of this invention to provide thin walled pipe or tubing with effective coupling grooves therein.

Another object is to provide pipe or tubing with such grooves which effectively engage coupling housings for the coupling together of sections of pipe or tubing in a manner to prevent the pulling apart of the coupled sections under internal pipe pressures sufficient to burst the conduit.

Another object is to provide pipe or tubing with grooves rolled thereinto which are accurate in and of themselves and with respect to the positioning of them longitudinally of the conduit, are uniform from one to the next, provide for the effective reception of the annular members of coupling housings and retain adequate wall strength to effect a safe joining of sections of thin wall pipe or tubing against any internal pressure that the pipe or tubing itself will withstand.

Another object is to provide such grooves, the walls of which present at least as much resistance against bursting of conduit as does the normal conduit wall.

Still another object is to provide such grooves which constrict the interior of the conduit to a minimum.

A further object is to provide a method for the forming of such grooves.

A still further object is to provide such a method which provides for such grooving in a uniform highly effective manner.

Further and more detailed objects will in part be obvious and in part be pointed out as the description of the invention taken in conjunction with the accompanying drawing proceeds:

In that drawing:

FIG. 1 is a sectional diagrammatic showing of an illustrative form of apparatus for use in performing the method of the invention in the forming of rolled coupling grooves in sections of light wall pipe or tubing.

FIG. 2 is a transverse section thereof taken on line 2—2 of FIG. 1 and looking in the direction of the arrows.

FIG. 3 is an enlarged fragmentary elevation of the registering means for the grooving and backup rollers.

FIG. 4 is an enlarged fragmentary section of portions of the grooving roller and backup roller of FIG. 1 showing the tube received therein with a fully formed groove.

FIG. 5 is a fragment partly in section and partly in elevation of a section of pipe grooved in accordance with an early form of the invention.

FIG. 6 is a showing siimlar to FIG. 3, but on reduced scale, of a somewhat modified registering means.

FIG. 7 is a view, similar to FIG. 5, but greatly enlarged showing the preferred form of rolled groove in accordance with the invention.

FIG. 8 is a vertical sectional view of a pair of fragments of pipe grooved as in FIG. 7 and with a coupling housing applied thereto; and FIG. 9 is an elevational view of a complete joint between two sections of pipe in accordance with the invention.

Though in the detailed description to follow the invention will be described from the standpoint of its applicability to thin walled tubing, it is of course to be understood, as is apparent from the preceding text, that the applicability of the invention is not limited to tubing alone. It is also applicable to pipe, particularly that having a thin wall, for it opens up an entirely new field in the coupling of thin walled conduit. It is also applicable to heavier walled conduit, should one wish to roll, rather than cut, coupling housing engaging grooves therein.

The showing of the apparatus of FIGS. 1–3 is by no means limiting with regard to effective forms of apparatus that may be employed for performing the method or forming the groove of the invention. The showing is, however, illustrative of a simple and effective form of mechanism usable on a production basis for roller grooving of tubing for coupling purposes in accordance with the invention.

The apparatus illustrated consists of a generally rectangular housing indicated at 1 and shown as having a top 2, a bottom 3, a front end 4 and a rear end 5. From the showing in FIG. 2 it will be seen that the housing also has sides 6 and 7 and that it is made in the form of two shells brought together about a vertical parting line 8.

The housing 1 serves as a mounting for a pair of shafts 9 and 10 which extend longitudinally therethrough. The lower of these is mounted to rotate about a fixed axis, being journaled for that purpose at the front end of the housing in the journal bearing carried by the block 11 and at the rear end in the journal bearing 12. The rear end 13 of this shaft projects out from the housing for engagement with any suitable means for turning it, as illustrated by the directional rotation arrow 14.

The shaft 10 is journaled at spaced positions within the housing, but these journals permit of pivotal movement so that the shaft may be swung into and out of parallelism with the shaft 9. One of these journals is in the form of a block 15, which is pivoted at a position beneath the shaft 10 on a pin 16. This pin extends across the housing and is suitably mounted in bosses 17 and 18 formed on the opposite sides of the housing. Preferably the axis of the pin 16 is substantially equidistant from the shafts 9 and 10 when they are in parallel position.

Toward the front end 4 of the housing, the shaft 10 is journaled in a suitable slide 19 mounted in pairs of slideways 20 and 21 at opposite sides of the housing. The slide 19 is equipped with a journal bearing 23 mounted to rotate therein about an axis transverse to the axis of the shaft 10. The bearing 23 is bored to receive the shaft 10 in rotatable relationship. Upward movement of the slide 19 is effected by means of a pair of springs 24 which act between the bottom of the slide and the upper surface of the journal block 11. Downward movement against the action of the springs, to the extent desired, is effected by the operating screw 25 journaled at 26 in the top wall 2 of the housing and turned by the handle 27. The extent of downward movement of the screw 25 is controlled by the position of a pair of lock nuts 28 positioned on the portion of the screw extending outwardly of the housing and engaging the upper surface of the boss 26 when the screw has been turned down to the desired position.

Where the shaft 10 extends out through the housing 1, it does so through vertically elongated slots 29 and 30 in the front and rear ends of the housing respectively.

From the foregoing description of the mounting of the shaft 10, it will be apparent that that mounting enables the shaft to be swung about the pivot 16 so that its left hand end, as viewed in FIG. 1, can be raised or lowered with respect to the shaft 9 as desired. The movement of these shafts apart is not very great, as is indicated by the dot-dash line showings at the end of the shaft. However, it is sufficient for the intended purpose as will now be pointed out.

In the first place, it is to be noted that the shaft 9 has a gear 35 pinned thereto at 36 with its right hand face closely adjacent the left hand end of the pivoted journal block 15. This gear meshes with a similar gear 37 pinned at 38 to the shaft 10. These gears have teeth 39 which extend out somewhat further than normal gear teeth. The purpose of this is to keep them in mesh as the portion of the shaft carrying the gear 37 is swung slightly upward away from the shaft 9. This position being close to the pivot the effect of the swinging action is slight, as is, consequently, the separation of the gears. There is thus no likelihood of the gears coming out of mesh.

Where the shafts 9 and 10 project out from the front end of the housing 1, they are provided with a pair of mated rollers generally indicated at 45 and 46. The roller 45 does the actual grooving, while the roller 46 serves to back up the tube interiorly and to control the flow of the metal displaced in the grooving action. Thus, as the rollers rotate and are brought toward each other by the turning of the screw 25, a section of tubing 47 placed between them will have a groove rolled thereinto. The outer surface of the grooving roller 45 has portions 48 and 49 both on the same radius with a protruding grooving flange 50 therebetween. The width of the flange 50 is the same as that of the groove that it is desired to roll into the exterior surface of the tube 47. The outer peripheral corners of the roller 50 are, however, rounded off as seen at 51 and 52 on the desired radius so that the curvature extends the desired distance up the portion of the sides 53 and 54 of the flange which actually projects into the groove in the tubing once the groove has been completed.

By reference to the enlarged showings in FIGS. 4 and 5, the finished groove in the wall of the tube 47, as here shown, and as generally indicated at 56, has a flat bottom 57 and short straight side wall portions 58 and 59 which join up with the bottom 57 in radiused corners 60 and 61. It has surprisingly been found, however, contrary to all previous beliefs concerning coupling grooves, that for best results for light wall pipe and tubing in normal pipe sizes it is preferable to form the corners 60 and 61 on such a radius that no straight side wall portions such as 58 and 59 need remain. Thus by reference to the preferred form as shown in FIGS. 7 and 8, it will be seen that the grooves shown in the sections of tubing 47a which grooves are generally indicated at 56b have flat bottoms 57b and radiused sides 60b and 61b which extend as concave curves without any straight side wall portion from the bottoms 57b to the downwardly inclined annuli 72b formed on the outer side of the tubes at either side of the grooves, and extend from the edges of the grooves outwardly for a substantial distance away from the grooves.

These annuli 72b, like the annuli 72 in the form of FIGS. 4 and 5, indicate the easy flow of metal in the forming of the groove of the invention, since they merely form by themselves as the result of a flowing of the metal at either side of the groove while the grooving is being effected. Metal which flows from this area flows naturally to strengthen the base of the groove in the tube.

Considering now the tube structure about the groove and the formation of the same, reference is made to the backup roller 46. This roller has a general configuration formed to cooperate with the flanges of the grooving rollers in order to enable the effective grooves to be formed and, at the same time, enable the strength of the tube to be maintained at the grooved position. This formation of the backup roller, the cooperation of the same with the grooving roller and the formation of the tube about the groove are departures from all prior practices in this regard and are important features of the invention. The manner in which the backup roller 46 cooperates with a flange 50 of a grooving roller to form the groove 46 is best shown in FIG. 4.

Heretofore it has been felt that if an effective groove were to be formed in pipe, or tubing, by a rolling action, the tube would have to be backed up interiorly by a back up roller having a groove width formed to closely receive the flange of the grooving roller plus a thickness of tube wall material no greater than, or even somewhat less than, the thickness of such material before grooving. Such a relationship was quickly recognized as ineffective because the drawing of the tube material into its abrupt grooved formation would thin out and disturb the material. Thus the pipe would be weakened at the grooved section so that it would fail under internal pressures less than those needed to burst the undeformed tube. It was felt, however, that such abrupt forming of the material of the tube was necessary to provide an effective groove, since it was believed that the groove should have straight side walls.

The grooving of the invention departs from such prior concepts and goes in the opposite direction. It is based on the discovery that for the forming of an effective groove there should be no abrupt backing up of the tube material about the grooved section. Rather the backing up should be of such a nature as to enable the metal to flow along a natural path and expand as it flows. Thus, the backup roll, instead of having straight side walls for its groove, parallel to the side walls 53 and 54 and extending parallel thereto, from the positions 62 and 63, departs from those positions in the form of smooth concave curves 64. These curves extend from the position 63 to the positions 65 and 66, which are aligned somewhat inward of the side walls 53 and 54 of the grooving flange. From the positions 65 and 66, the base of the groove in the backup roll extends inwardly in short portions having straight cylindrical surfaces 67 parallel to the normal backup surfaces 68 and 69 of the roller extending from either side of the groove. From the short portion 67 the backup groove extends in inwardly and downwardly inclined sections 68 which approach each other at a small angle with respect to the horizontal and meet at a center position 69 which is preferably radiused off on a small curve.

It has been found in practice that the grooving of the backup roller as just described when such a groove is aligned with the flange of the grooving roller enables the formation of a groove in light weight tubing which is effective for holding the key section of a coupling against pressure that would burst the tube. This is particularly true when the grooving roller has its corners formed on a sufficient radius that no straight side walls are necessarily formed in the groove. Such roller relationship also causes the metal of the tube about the groove to form in such a manner that a section of pipe coupled by means of such a groove when subject to an internal bursting pressure will burst somewhat along the normal run of the tube and not at the groove portion thereof.

The provision of the concave curved portion 64 at the backup groove, particularly when in opposed relation to the suitably radiused edges 60 and 61 of the grooving flange 50, enables the metal to flow smoothly down into the groove in the backup roller. Inwardly of the portion 64 the metal is supported for a short distance by the straight portion 67 lying parallel to the end face 70 of the flange 50 which assures that the base of the groove 57 in the tube will conform to the surface 70 of the flange. From the end of the surfaces 67 to the center of the backup roll the metal is again given freedom to flow down the sloping sides 68. Thus the tube has a thickness and a flow of relatively undisturbed metal at the positions 71 beneath the corners 60 and 61 of the grooving flange where such metal is needed to resist the shearing action imposed by internal pressure in the pipe tending to force coupled sections apart. This flow of material, which also continues under the base of the groove 57 also serves to protect the tube against bursting at this position.

The width of the flange 50 between its sides 53 and 54 determines the width of the groove 56 being formed in the tube since that groove will have the same width as the width of the flange. The multi-surfaced groove formed in the backup roller 46 and opposing the flange 50 must have its center closely aligned with the center of the face 70 of that flange. Furthermore, certain general relationships between the surface of the groove in the backup roller and the working surfaces of the flange must be maintained if effective grooving is to be achieved. In the first place, the lines 62 and 63, from which the concave curves 64 commence, must be positioned outwardly with respect to the sides 53 and 54 of the grooving flange 50 a distance which is substantially equal to the thickness of the tubing being grooved. Then the concave curves 64 must be on such a radius with respect to the corners 60 and 61 of the flange 50, that the thickness of the material 71 will be maintained at substantially the thickness of the tube, at least up to the point where the curves 64 approach the end of the rounded corners 60 and 61 on the flange 50. Then, for a short distance at the end of the curves 64 and across the portions 67, the material behind the groove may be of lesser thickness than that of the thickness of the pipe, for here any stress is one of tension and not of shear. The structure of the metal in this thinnest portion should not, however, be disturbed and this is provided for by allowing space for flow by means of the depression formed from the angularly related sides 68 of the center part of the groove.

The light wall pipe and tubing with which the invention is concerned is that which is generally commercially recognized as such. In other words it is that pipe and tubing which is of less wall thickness than schedule 40 pipe, the latter being universally known as standard weight. Where pipe and tubing of normal size is referred to herein a range from 1¼" to 12" is comprehended. The normal wall thickness in this size range would vary from .050 in the 1¼" size to .250 in the 12" size.

Though various metals and their alloys could be used for the pipe or tubing with which the invention is concerned aluminum and steel are the most commonly contemplated materials. The joining of pipe made of copper and stainless steel is also contemplated.

For pipe and tubing within the range given for normal sizes and thicknesses the grooving formation as illustrated in FIGS. 7 and 8 is preferred. This is true whether the pipe be of steel or aluminum. As seen in these figures the side portions of the groove 56b and 61b are continuous curves from the flat bottom 57b to the inclined portions 72b. This curvature is preferably on a radius of substantially .078" for it provides most nearly uniform thickness of the wall in back of the groove when the grooving is effected employing a back up roll following the principles employed in the make up of the back up roll 46. The groove 56b as seen in FIGS. 7 and 8 retains the key section 56c of the coupling housing 56d so effectively that one of the pipes would burst under pressure at some position spaced from the groove before the joint would pull apart.

Though a radius of .078" for the curves 60b and 61b is preferred for both steel and aluminum pipe, steel pipe can still be effectively coupled with grooves within the range from the form of FIGS. 4 and 5 to that of FIGS. 7 and 8. In the form of FIGS. 4 and 5 the radius of the curvature at corners 60 and 61 is approximately .037". This, with a groove of full depth formed in pipe of normal thickness, still leaves short straight wall portions between the upper ends of the corners 60 and 61 and the inclined surface 72. However, the key section of a coupling housing when applied to the groove of FIGS. 4 and 5 has its inner corner edge in engagement with the radius 61, the same as the engagement of the edge 56e with the radius 61b in the FIG. 8 form. This manner of engagement, where a relatively sharp corner of the key section bites into the radius, appears to be one of the effective features for the coupling of light wall pipe and tubing.

It will be apparent that the reduction of the interior diameter of the pipes resulting from the grooving will commence on the surfaces 74 and 74b resulting from the action of the appropriate portions of the back up roller and will continue in sections such as 67a and 67b of less thickness than that of the pipe. The small center portions 73 and 73b have the greatest inward projection. Thus resistance to flow through the pipe is minimized and there is no abrupt surface opposing the flow, rather the surfaces facing the flow are on a gradual incline.

It will be apparent from the foregoing that in order for accurate and effective grooving in accordance with the invention to be achieved, the centered relationship of the particular grooving roller such as 45, and particularly of its flange 50, with respect to the backup roller such as 46 and the groove therein must be maintained. This is achieved by the provision of a tongue and groove arrangement of registering members here shown as forming extensions of the rollers 45 and 46 but which may, of course, be separate elements so long as they were closely adjacent to the said rollers and are positively secured in fixed axial position to the shafts 9 and 10.

With particular reference to FIGS. 1 and 3 it will be seen that the roller 45 has an extension 75 from the right hand end thereof, which extension is itself on a considerably smaller radius than that of the normal surface of the roller 45 and carries a thin tongue-like flange 76 of substantially greater radius than the roller 45 or of its grooving flange 50. A mating receiving groove for the tongue flange 76 is provided at the right hand end of the backup roller 46 by means of a pair of spaced collar members 77 and 78 which extend radially outwardly a substantial distance from the joining portion 79 to furnish a deep groove for the reception of the tongue flange 76. An important feature of this construction is that the groove 80 provides for the reception of the tongue flange 76 with merely a small clearance between the sides of that groove and the sides of the tongue. Such clearance is just sufficient to enable the tongue 76 to be moved up and down in the groove as the shaft 10 is swung about the pivot 16 to separate the rollers 45 and 46 to sufficient extent for the removal and replacement of the tube sections 47 between the rollers. Inasmuch, however, as the shaft 10 mounted to swing about the axis of the pin 16 and that axis lies substantially on a line equidistant between the normal faces of the rollers 45 and 46, when those faces are in parallel relationship, the clearance needed for the required small movement of the tongue 76 in the groove 80 is quite small.

The extent of travel of the tongue and of the roller 45 during this swinging action is indicated by the distance between the solid and dotted lines in the FIG. 1 showing. That travel is insufficient to cause the tongue 76 to be moved all the way out of the groove 78. In fact, the location of the axis of the pin 16 minimizes the curvature of the path of the tongue 76 as much as possible. Hence, though it is appreciated that the ideal relationship of the tongue 76 and the groove 80 would be one as illustrated in FIG. 6 where the opposed surfaces of the tongue and groove are sections of spheres radiused about the axis of the pin 16, it has been found that it is not necessary to go to the extent of such an expensive refinement to achieve effective and accurate grooving as heretofore described. In apparatus for grooving tubing of thicknesses in the general range of those heretofore indicated, a clearance of .005" for the tongue 76 within the groove 80 is found to be all that is necessary.

In addition to providing one side of the groove 80 the collar 77 performs another function as illustrated in FIG. 1. From this showing it is seen that the outer surface 81 of the collar 77 extends above the backup surfaces 68 and 69 of the backup roller to provide a stop for the end 82 of the tube section to be grooved. To properly locate the groove with respect to the end of the tube section all the workman has to do is to slide the section in over the backup roller 46 until its end 82 abuts the surface 81 and held it there until the grooving has gone far enough to register itself. Then, since the longitudinal position of the rollers 45 and 46 is maintained by the relationship of the tongue 76 with the groove 80, the exact longitudinal position of the groove in the pipe will be maintained.

Though the screw 25 is here shown as hand actuated by the handle 27 to move the roller 45 towards the roller 46 while effecting the grooving with a stop provided where the lower one of the lock nuts 28 engages the upper surface of the boss 26, it is of course to be understood that this showing is merely for illustrative purposes. The screw could be power driven and stopped by a suitable means, or the slide 19 could, of course, be actuated by various other mechanical expedients, as well as by the action of air or hydraulic cylinders.

The bringing together and separating of the rollers 45 and 46 has here been shown to be accomplished by the pivoting of one shaft with respect to the other. This is presently believed to be the most simple and economical form of apparatus for achieving such end, but it is of course to be appreciated that the end may also be achieved in other ways. An alternative is to mount one of the shafts so that it may be swung toward and away from the other in toto while the shafts are maintained in parallel relationship.

The fragmentary showing of FIG. 6 illustrates the arrangement heretofore referred to whereby a tongue flange 88 carried by a roller 87 has its faces 88 and 89 formed as surfaces of a sphere mated to the surfaces 90 and 91 of the sides of the groove 92 formed by the collars 93 and 94. With these spherical surfaces centered about a pivot, lying on the axis of the rod 16 on which the shaft 10 swings, it will be obvious that movement of the tongue in the groove can be effected with practically no clearance. The forming of such surfaces on the members would, however, be an expensive operation, introducing little or no advantage into the mechanism, so the expense of it would not normally be warranted.

From the foregoing description of the method and suitable apparatus for carrying out that method for forming the product of the invention an appreciation of the distinctions and advantages provided by that product manifests itself. First off, it is appreciated that this is no ordinary tube with a groove formed in it. Rather the structure and formation of the tube about the groove are quite a departure from what was heretofore thought necessary for the coupling of conduits by means of grooves engaged by the key sections of coupling housings. The structure and formation of the invention groove embody characteristics not heretofore found in any grooved pipe or tubing. They enable rapid, economical and fully effective coupling of thin tubing and thus open a wide field for its use heretofore substantially barred by the apparently insurmountable and vexatious problems involved in the prior art manners of coupling sections together.

A grooved tubing structure such as this where the sections at 71 and 71b, opposite the inner corners of the groove, are substantially as thick as the normal thickness of the pipe, is contrary to all prior concepts. With cut grooves and with straight side walled rolled grooves the thinnest and weakest area would be present at this position. Furthermore, the structure of the metal in this section is left relatively undisturbed rather than being weakened as by the prior art working. Then, the appreciation that a portion of the stock underlying the groove could be allowed to run to a thickness reduced from that of the normal tube wall without reducing the effectiveness of this section of the tube is also contrary to prior concepts. Finally the providing of a center section beneath the center of the groove by a free flow of metal without confining it from beneath is also contrary to prior practices.

Another feature departing from prior practices resides in the downwardly sloping annuli 72 and 72b at either side of the groove. Heretofore, it has been thought necessary to build up the metal at this position. In accordance with the invention, however, it was discovered that by allowing a free flow of the metal around the sides of the groove and the consequent formation of the inclined depressions 72 and 72b, the side walls of the groove would still be of sufficient height to properly engage the key section of the coupling housing while the metal would flow into the portions 71 and 71b where the real strength is needed.

To a large extent the joining of two sections of light wall tubing 47a by means of joined coupling housings 56d, as seen in FIG. 9, has the exterior appearance of the coupling of heavier pipes by means of cut grooves. On closer examination however, the downwardly inclined annuli 72b will be seen formed in the tubing sections at either side of the coupling housings. This however is an indication of strength rather than of any weakness of the joint.

Interiorly of the coupling housing a pressure responsive gasket 100, (FIG. 8), of C shape in cross section, has its lips 101 seated on the extending portions 102 of the tubing sections. The opening in the gasket overlies the space 103 between the ends of the tubing sections 102. Thus the joint has flexibility while still being pressure tight. Here again the particular forming of the groove enhances the joining and helps assure its tightness. This is because the sections 102 project from a strong grooving formation and are thus supported in their initial shape to maintain full effectiveness of the gasketing.

Since certain changes and modifications may be made in carrying out the above process and in the product without departing from the scope of the invention, it is intended that all matter contained in the above description or shown in the accompanying drawing shall be interpreted as illustrative and not in a limiting sense.

This application is a continuation in part of our copending application Serial #546,612, filed November 14, 1955, entitled Grooved Tubing and Method and Apparatus for Forming Same, now abandoned.

Having described our invention, what we claim as new and desire to secure by Letters Patent is:

1. A pressure tight joint formed between sections of thin walled internally unreinforced conduit, including two sections of such conduit and a circumferential clamp type coupling housing formed of housing sections adapted to be drawn together for clamping engagement with the conduit sections, each of said conduit sections adjacent the joined ends thereof being formed with annular rolled grooves in the exterior surfaces thereof and extending inwardly with respect to the cylinder of the outside wall of said conduit, said grooves being of no greater depth than the thickness of the wall of said conduit, said grooves having substantially flat cylindrical bottoms and concavely curved side walls extending radially outwardly from said bottoms, the wall material of said conduits beneath the bases of said grooves projecting inwardly of the normal internal cylindrical walls of said conduits, said projections being substantially wider than said groove, the wall of said conduit through said grooved section being substantially as strong as the wall of the ungrooved portion of said conduit, the exteriors of said conduit sections between said grooves and the free end faces of said conduits being formed with smooth cylindrical gasket receiving surfaces thereon, a gasket overlying the gap between said conduit ends and having portions engaging said gasket receiving surfaces, said coupling housing encompassing said gasket and said coupling housing at the axially remote ends thereof being formed with radially inwardly extending key sections, said key sections being substantially rectangular in cross section and being seated in said grooves with the radially inwardly facing surfaces of said key sections located adjacent to and substantially in abutting relationship with respect to the bottoms of the respective grooves.

2. A pressure tight joint formed between sections of thin walled internally unreinforced conduit, including two sections of such conduit and a circumferential clamp type coupling housing formed of housing sections adapted to be drawn together for clamping engagement with the conduit sections, each of said conduit sections adjacent the joined ends thereof being formed with annular rolled grooves in the exterior surfaces thereof and extending inwardly with respect to the cylinder of the outside wall of said conduit, said grooves being of no greater depth than the thickness of the wall of said conduit, said grooves having substantially flat cylindrical bottoms and having side walls, said side walls including concavely curved side wall portions extending radially outwardly from said bottom, the wall material of said conduits beneath the bases of said grooves projecting inwardly of the normal internal cylindrical walls of said conduits, said projections being substantially wider than said grooves, the wall of said conduit through said grooved section having substantially the same thickness as the wall of the ungrooved portion of said conduit, the exteriors of said conduit sections between said grooves and the free end faces of said conduits being formed with portions having smooth cylindrical gasket receiving surfaces thereon, a gasket overlying the gap between said conduit ends and having portions engaging said gasket receiving surfaces, said coupling housing encompassing said gasket and said coupling housing at the axially remote ends thereof being formed with radially inwardly extending key sections, said key sections being substantially rectangular in cross section and being seated in said grooves, with the radially inwardly facing surfaces of said key sections located adjacent to and substantially in abutting relationship with respect to the bottoms of the respective grooves.

3. A pressure tight joint as in claim 2 and including the exteriors of said conduit sections having portions extending between said grooves and said smooth cylindrical gasket receiving surfaces forming substantially conical sections inclining radially inwardly in a direction towards said grooves.

4. A pressure tight joint as in claim 2 and including said concavely curved side wall portions extending part way up said side walls of said grooves from said bottoms and the remainder of said side walls being formed as straight portions extending at substantially right angles to said bottoms.

5. A pressure tight joint as in claim 2 and including said concavely curved side wall portions extending throughout the full height of said side walls.

References Cited in the file of this patent

UNITED STATES PATENTS

| | | |
|---|---|---|
| 555,915 | Fuhrmann | Mar. 3, 1896 |
| 1,541,601 | Tribe | June 9, 1925 |
| 1,571,343 | Register | Feb. 2, 1926 |

(Other references on following page)

UNITED STATES PATENTS

| | | |
|---|---|---|
| 1,678,640 | Hall | July 31, 1928 |
| 1,873,914 | Adams | Aug. 23, 1932 |
| 2,133,313 | Weatherhead | Oct. 18, 1938 |
| 2,192,914 | Ice | Mar. 12, 1940 |
| 2,286,783 | Bell | June 16, 1942 |
| 2,338,161 | Ashton | Jan. 4, 1944 |
| 2,377,510 | Newell | June 5, 1945 |
| 2,451,587 | Taylor | Oct. 19, 1948 |
| 2,466,076 | Bentley et al. | Apr. 5, 1949 |
| 2,487,470 | Osborn | Nov. 8, 1949 |
| 2,777,715 | Beyer | Jan. 15, 1957 |
| 2,793,532 | Johnson | May 28, 1957 |
| 2,821,415 | Race | Jan. 28, 1958 |

FOREIGN PATENTS

| | | |
|---|---|---|
| 553,388 | Germany | June 25, 1932 |